US008185491B2

(12) United States Patent
Kuester et al.

(10) Patent No.: US 8,185,491 B2
(45) Date of Patent: May 22, 2012

(54) METHOD OF ORGANIZING SOFTWARE DESIGN DECISION INSTANCES

(75) Inventors: Jochen M. Kuester, Zurich (CH); Nelly Schuster, Kilchberg (CH); Michael S. Wahler, Zurich (CH); Olaf W Zimmerman, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 11/954,625

(22) Filed: Dec. 12, 2007

(65) Prior Publication Data

US 2009/0157582 A1    Jun. 18, 2009

(51) Int. Cl.
*G06F 15/00* (2006.01)
(52) U.S. Cl. .......................................... 706/62; 717/123
(58) Field of Classification Search .................... 706/20; 717/123
See application file for complete search history.

(56) References Cited

U.S. PATENT DOCUMENTS

| 5,247,681 | A * | 9/1993 | Janis et al. ..................... 719/331 |
| 5,734,837 | A * | 3/1998 | Flores et al. ..................... 705/7 |
| 2003/0191679 | A1* | 10/2003 | Casati et al. ..................... 705/8 |
| 2007/0245297 | A1* | 10/2007 | Kuester et al. ................ 717/104 |
| 2007/0297329 | A1* | 12/2007 | Park et al. .................. 370/230.1 |
| 2008/0288304 | A1* | 11/2008 | Nores et al. ........................ 705/7 |

OTHER PUBLICATIONS

Abrams et al.:, Architectural thinking and modeling with the Architects' Workbench, IBM Systems Journal vol. 45, Mar. 2006, pp. 481-500.
Zimmermann et al.:, "Reusable Architectural Decisions for Enterprise Application Development. Paper presented at QoSA 2007" (Jul. 13-15, 2007), 18 pages.
Kruchten:, "An Ontology of Architectural Design Decisions", in: Jan Bosch (ed.), Proc. Of the 2nd Workshop on Software Variability Management, Groningen, NL, Dec. 3-4, 2004, 8 pages.
Model Transformation Framework, IBM alphaWorks , date posted Dec. 14, 2004, 2 pages.
Schuster:, "Collaborative Sytem for Architectural Decision Modeling and Decision Process Support based on Web 2.0 Technologies", Mar. 27, 2007, Hochschule der Medien, (Stuttgart), 156 pages.
Robbins et al.: "Extending Design Environments to Software Architecture Design", KBSE 1996 IEEE 1996 Conf on Knowledge-Based Software Engineering, Syracuse, NY Sep. 25-28, 1996 10 pages.
Zimmermann et al.:, "The Role of Architechural Decisions in Model-Driven SOA Construction", Proceedings of the 4th International Workshop on SOA and Web Services Best Practices and Patterns, OOPSLA 2006, 7 pages.

* cited by examiner

*Primary Examiner* — Jeffrey A Gaffin
*Assistant Examiner* — Mai T Tran
(74) *Attorney, Agent, or Firm* — Cantor Colburn LLP; Daniel Morris

(57) ABSTRACT

A method of organizing received decision instances based on reference architecture, including determining a respective particular project phase attribute for each of the decision instances, classifying the decision instances, determining a respective scope attribute for each of the decision instances, categorizing the decision instances in accordance with each of the respective scope attributes thereof, for all decision instances with the same categorization and with the same classification, ordering the corresponding decision instances by model elements, modeling directed links between apparently dependent decision instances, analyzing the dependent decision instances to confirm that the decision instances satisfy the apparent dependencies represented by the directed links and producing an error message if a result of the analysis is negative, and generating a real-time updateable and/or modifiable to-do list interface.

5 Claims, 5 Drawing Sheets

METHOD OF ORGANIZING SOFTWARE DESIGN DECISION INSTANCES

BACKGROUND OF THE INVENTION

1. Field of the Invention

Aspects of the present invention are directed to a method of organizing decision instances and, more particularly, to a method of organizing decision instances based on reference architecture.

2. Description of the Background

During software construction processes, many design decisions have to be made and, as a result, several challenges exist. These challenges include how to identify the required decisions, including design alternatives, how to choose design alternatives that meet the functional and non-functional requirements in a given problem, project, and decision context, and which do not conflict with decisions already made and decisions to be made later, and how to enforce that made decisions lead to concrete actions and are implemented.

While tools for making software design decisions exist, these tools have major drawbacks in terms of decision identification, decision enforcement, and scalability. Conversely, operable process tools exist but may only describe steps or operations to be performed and/or what information should be captured without further specifying a capturing method or algorithm. Also, these tools may not be integral with analysis and design tools such that they cannot provide programming and/or communication interfaces that align design and decision modeling information.

SUMMARY OF THE INVENTION

In accordance with an embodiment of the invention, a method of organizing received decision instances based on reference architecture is provided and includes determining a respective particular project phase attribute for each of the decision instances, classifying the decision instances in accordance with each of the respective particular project phase attributes thereof, determining a respective scope attribute for each of the decision instances in each set of decision instances classified in accordance with each of the respective particular project phase attributes, categorizing the decision instances in accordance with each of the respective scope attributes thereof, for all decision instances with the same categorization and with the same classification, ordering the corresponding decision instances by model elements to which each applicable decision instance refers, modeling directed links between apparently dependent decision instances, whose apparent dependencies are derived from the reference architecture, analyzing the dependent decision instances to confirm that the decision instances satisfy the apparent dependencies represented by the directed links and producing an error message if a result of the analysis is negative, and generating a real-time updateable and/or modifiable to-do list interface in which the classified, categorized and ordered decision instances are represented along with corresponding directed links.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
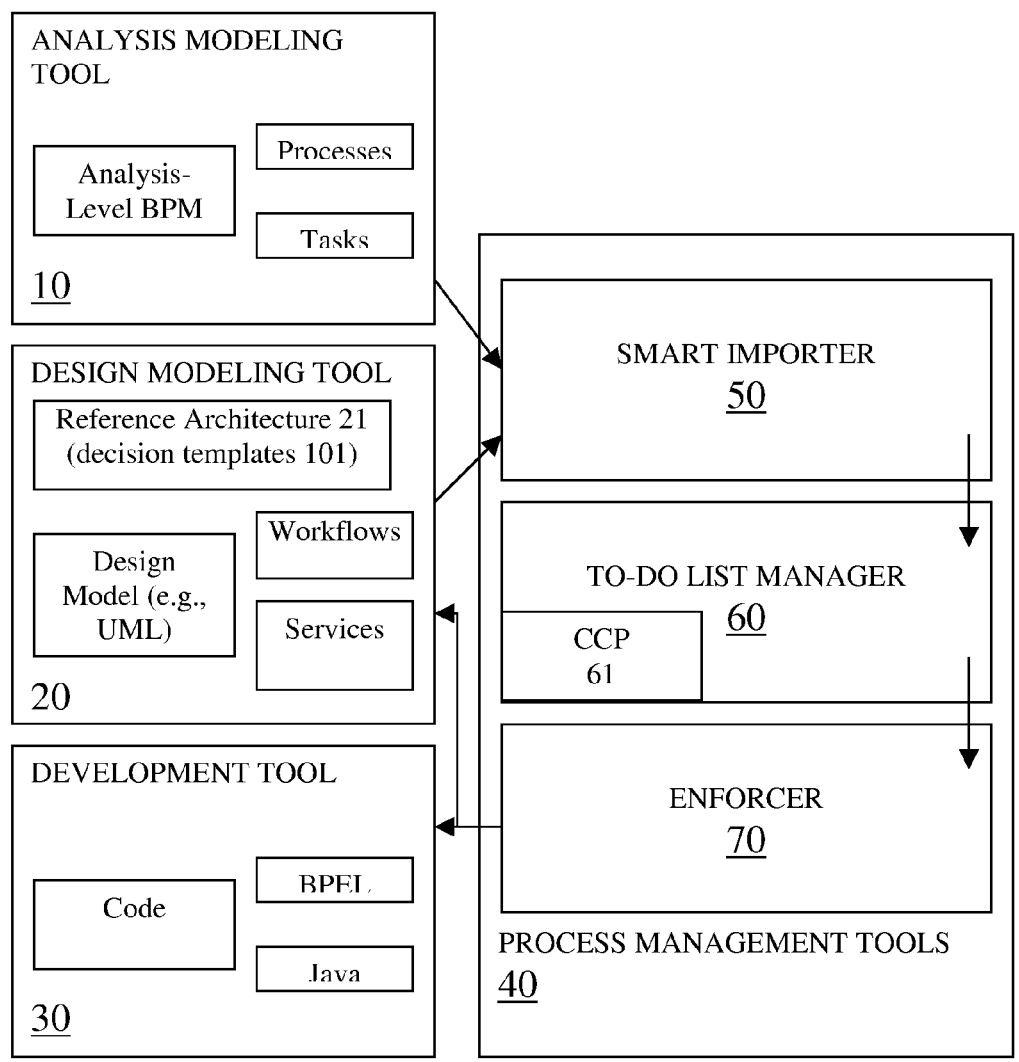
FIG. 1 is a schematic diagram of an overview of decision space management organization according to an exemplary embodiment of the present invention.

With reference to FIG. 1, decision space management organization includes an analysis modeling tool 10 in which, e.g., a business process may be expressed, a design modeling tool 20 in which, e.g., databases or other similar data structures may be maintained, and a development tool 30 including coding instructions. The decision space management organization further includes process management tools 40, including a smart importer 50, which will be discussed in detail below, a to-do list manager 60 coupled to the smart importer 50, which either manages to-do lists derived from the output of the smart importer 50 or provides the smart importer 50 with storage to be populated by output from the smart importer 50, and an enforcer 70 coupled to the to-do list manager 60, which ensures that made decisions are inputted to the design model and development tools 20 and 30.

In an example, a business process in an analysis-level business process management (BPM) may represent how a web browser allows human users to access and navigate a website. Among the tasks that would have to be accomplished for such a business process to be completed are to open a web browser window or tab (actor: user), to enter the URL of the website to be displayed (actor: user), to get the HTML content from the website (actor: web browser) and to render the content (actor: web browser).

Continuing the example, according to reference architecture (RA) for web browser designs, software components such as a web browser tab, a web browser window, and an HTTP client must be designed and implemented to address these requirements. In the design modeling tool 20, the web browser tab and the web browser window are represented as design model elements. Each of these design model elements is then understood as being a user interface element design model element type. When designing and implementing such software components, the following software design decisions must be made for each of these design model elements: where to position the menu bar (i.e., menu positioning), how to color code the user interface element and/or how to control accessibility to and from the user interface element.

The design modeling tool 20 maintains databases of known variables and constraints. That is, the design modeling tool includes the reference architecture (RA) 21, including decision templates 101 and design models comprising of representations of software components such as UML class diagrams representing the web browser tab, the web browser window, and the HTTP client. With respect to the decision instances 301, these are generated as analysis-level BPMs become available and it becomes possible to analyze which decisions arise during the software construction process and which are necessary to implement the requirements stated in the analysis-level BPM. In the example, menu positioning, color coding, and accessibility control are design decisions required both for the web browser tab and the web browser window, but not for the HTTP client (the latter is not a user interface element).

Still referring to FIG. 1, the smart importer 50 is coupled to the analysis modeling tool 10 and the design modeling tool 20. Now referring to FIG. 2, the smart importer 50 generates decision instances 301 that populate the to-do lists managed by the to-do list manager 60 (see FIG. 1) based on information received from the analysis modeling tool 10 and information accessed in the design modeling tool 20. That is, the smart importer 50, which may comprise a set of computer readable executable instructions, operates according to an exemplary algorithm and thereby identifies design model elements 201 of a requirements model (RM), as shown in FIG. 2, that are architecturally relevant, associates the design model elements 201 with concepts described in the reference architecture 21 and configures an initial decision space in accordance with information derived from the reference architecture 21 concepts.

Figure 2:
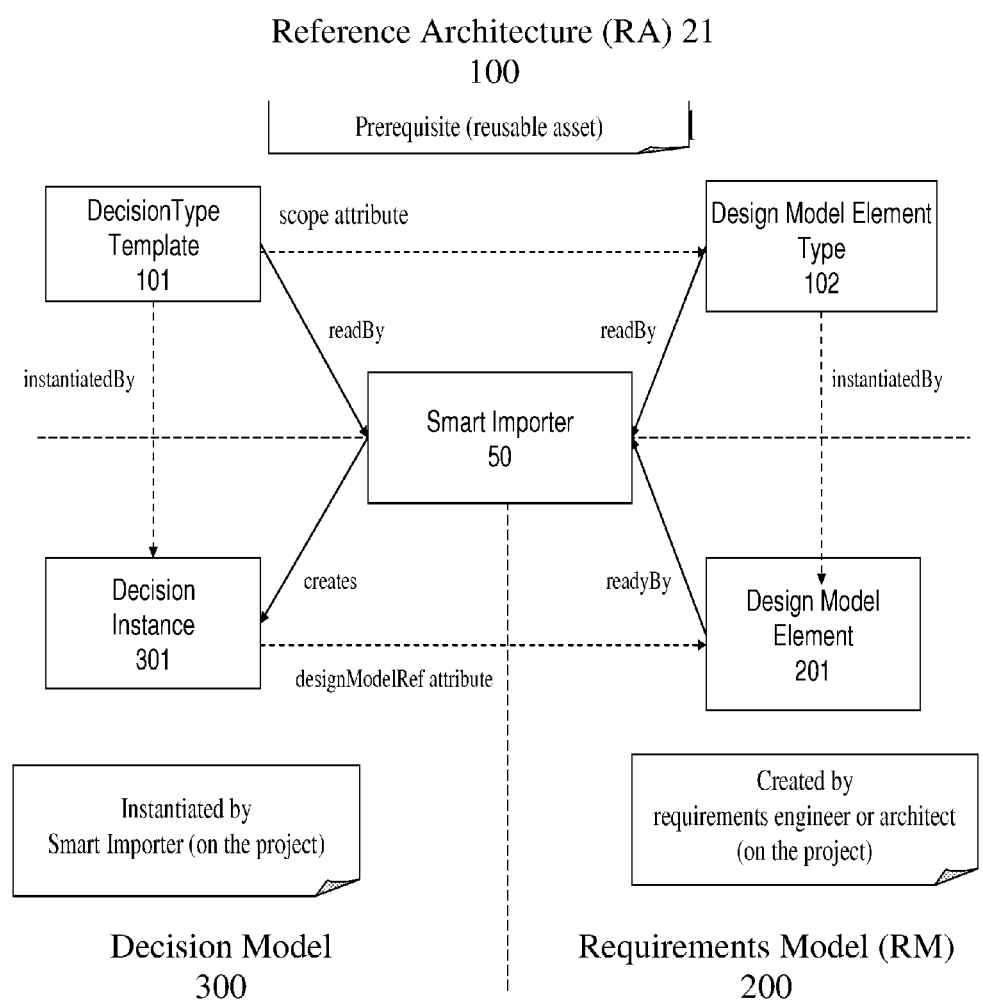
FIG. 2 is a schematic diagram of a smart importer according to an exemplary embodiment of the present invention.

In detail, with reference now to FIGS. 1 and 2, in an exemplary embodiment, a requirements engineer or a software architect may use the analysis modeling tool 10 to generate an analysis-level BPM, which is inputted into the smart importer 50 as the RM 200 and the smart importer 50 analyzes the RM so as to identify the architecturally relevant design model elements 201 therein.

In the example given above, it is noted that the identification of the architecturally relevant design model elements 201, which are characterized by a high level of abstraction, would identify the designing and the building of the web browser tab and web browser window functionality for a particular web browser that allows a user to access and navigate arbitrary websites as two exemplary design model elements 201 of the RM 200.

Once the design model elements 201 are identified, for each design model element 201, the smart importer 50 computes a design model element type 102 by accessing the databases of the design modeling tool 20 in which a set of design model element types 102 are stored as prerequisites (or, reusable assets) 100 and by identifying a particular design model element type 102 for which the design model element 201 is an instance thereof.

Having computed the design model element type 102 for each design model element 201, the smart importer 50 again communicates with the design modeling tool 20 to access the databases relating to the reference architecture 21. The reference architecture 21 includes the set of decision templates 101 that have been developed previously from successfully completed software construction projects and, like the design model element types 102, are stored as prerequisites (or, reusable assets) 100. Once the smart importer 50 locates a decision template 101 as a result of the accessing operation, the smart importer 50 confirms that a scope of the decision template 101 is applicable to the design model element type.

Once a decision template 101 having an appropriate scope is found, the smart importer 50 generates a decision model 300 including decision instances 301 based on the decision template 101. The decision instances 301 are to be applied to the design model element 201, such that, in accordance with the example, the smart importer 50 and the to-do list manager 60 cooperate to send a message or otherwise notify an appropriate entity, e.g., a software engineer, that decisions need to be made regarding menu positioning, color coding and accessibility for the two design model elements representing the tab and the window functionality.

Figure 3:
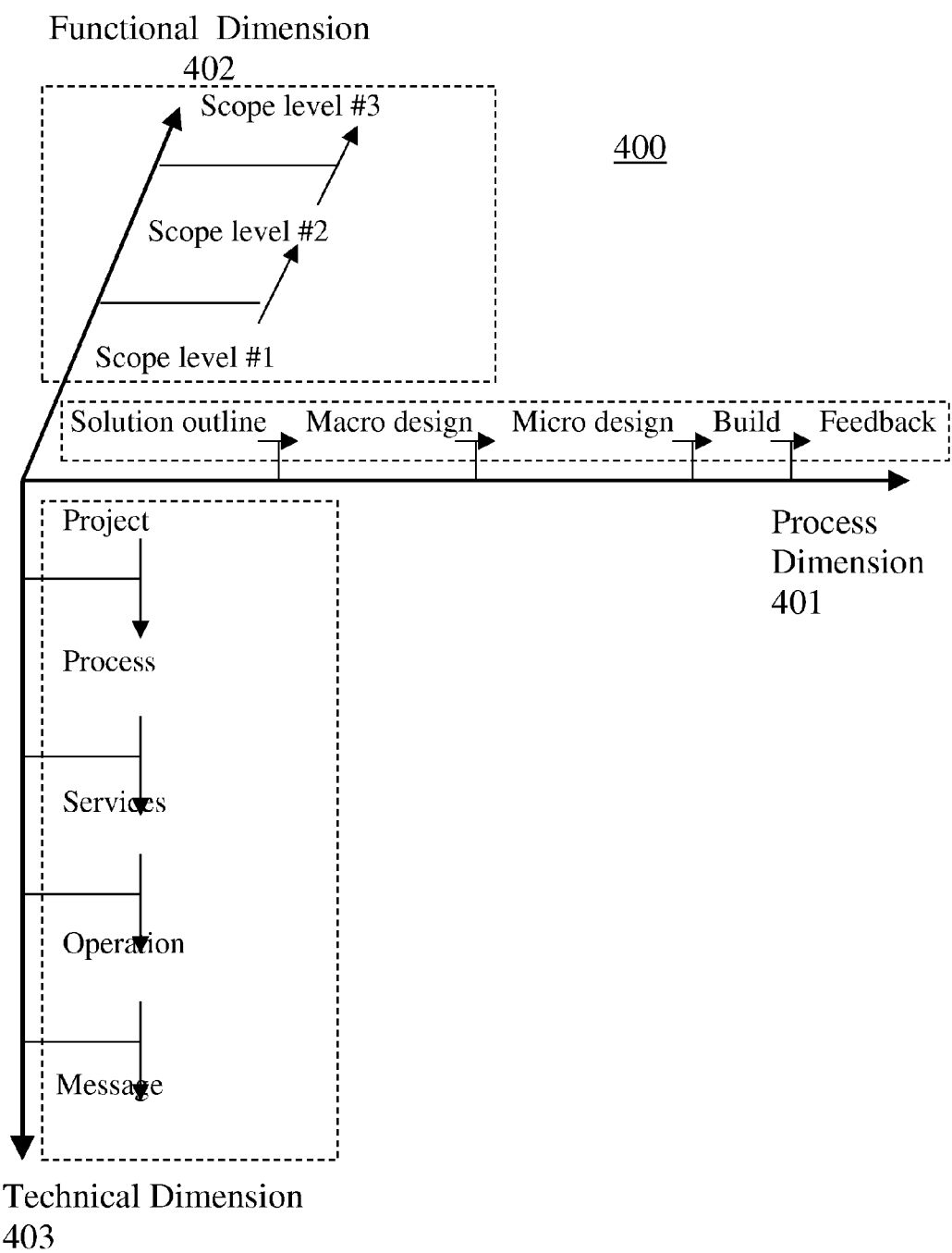
FIG. 3 is a schematic diagram illustrating a three (3)-dimensional (3D) decision space in accordance with an exemplary embodiment of the invention.
Figure 4:
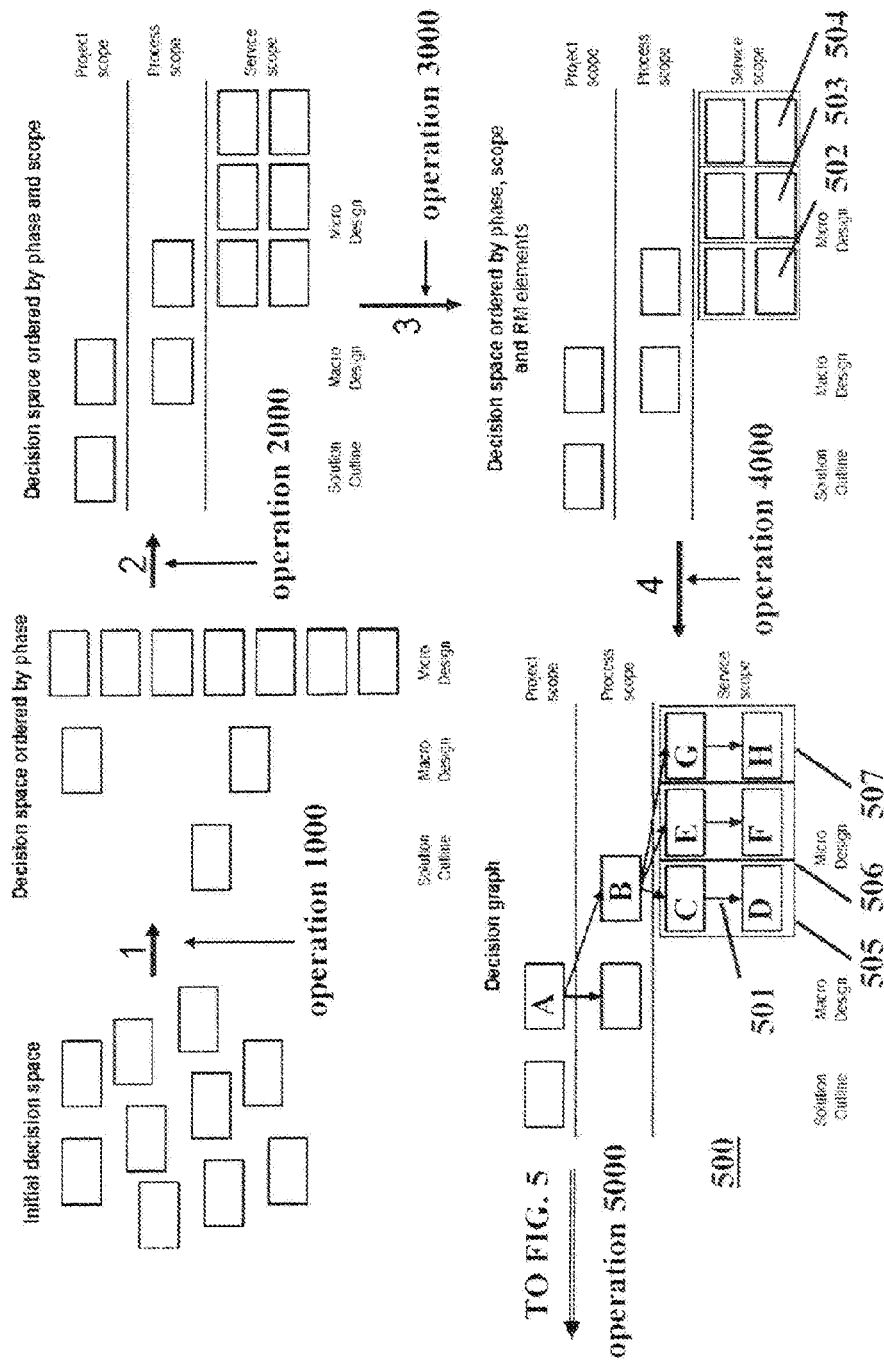
FIG. 4 is a schematic flow diagram in which a decision space is ordered and graphed in accordance with an exemplary embodiment of the invention.
Figure 5:
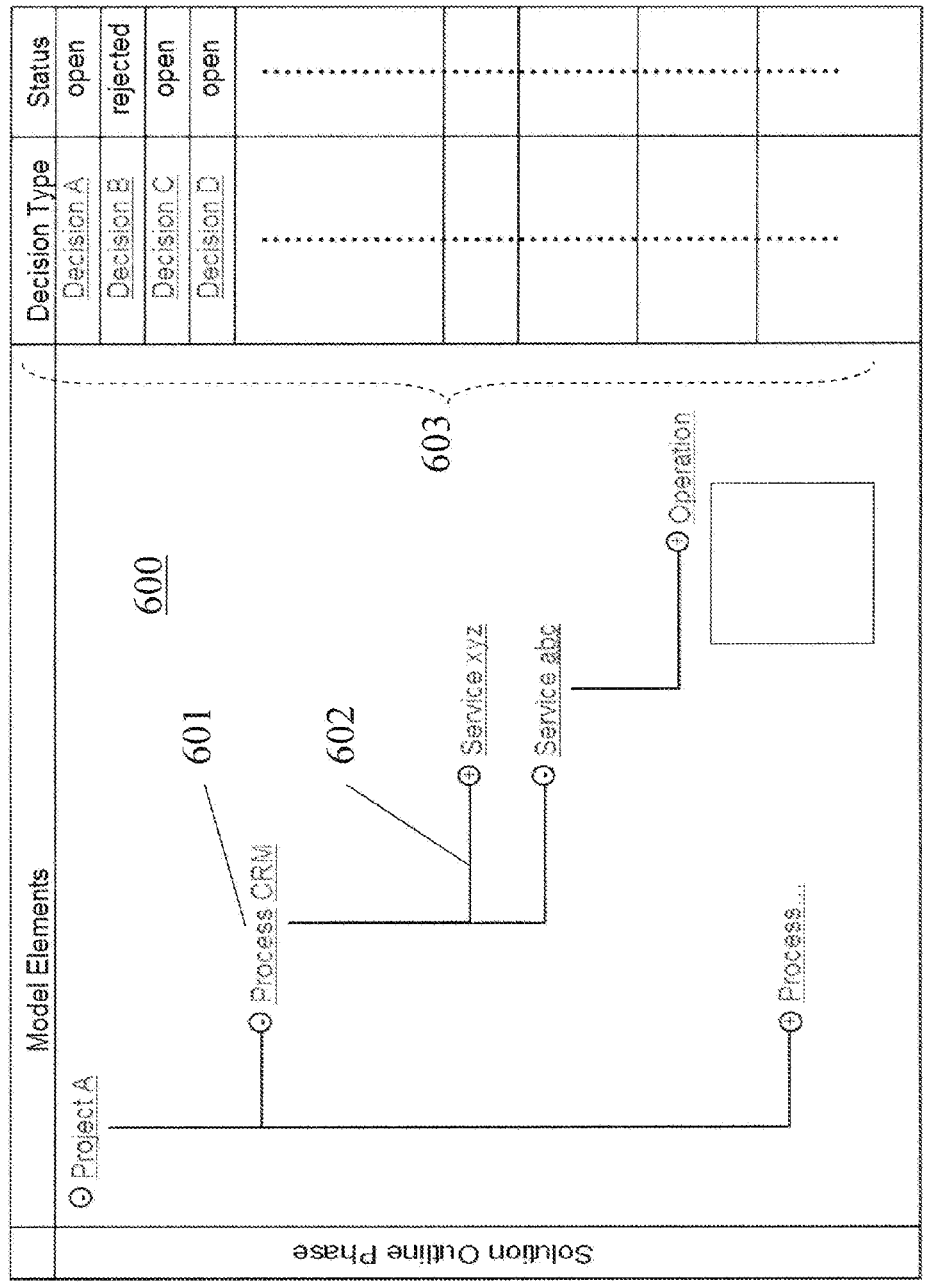
FIG. 5 is a graphical user interface according to an exemplary embodiment of the invention.

With reference now to FIGS. 3-5, a method of operating the to-do list manager 60, of FIG. 1, will now be described. According to the method, the decision instances 301, which are outputted by the smart importer 50, are organized by the to-do list manager 60 in view of the reference architecture 21.

Initially, as shown in FIG. 3, each decision instance 301 is classified, categorized and ordered so as to be positioned within a virtual three-dimensional schematic (3D) diagram 400 by the to-do list manager 60. The axes of the 3D diagram are defined as relating to a process dimension 401, a functional dimension 402 and a technical dimension 403 relating to the decision model 300. Of course, it is understood that other definitions for the axes are possible in accordance with particular business requirements or conventions.

With reference now to FIGS. 3-5, in plotting a position of each of the decision instances 301, a particular project phase attribute (hereinafter referred to as a "phase") for each of the decision instances 301 is classified as being all or a part of, e.g., a solution outline for software being designed, a macro design, a micro design, the building of the software, and feedback regarding the built software (operation 1000 of FIG. 4). Here, phase-specific information about current decision instances 301 is analyzed by the to-do list manager 60. Further, it is noted that the phase classes shown in FIG. 3 and discussed herein are exemplary only and could be defined in other ways or defined in lower or greater numbers of phases or other phase names.

In addition to the phase classification, a scope attribute of each of the decision instances 301 is categorized as being within, e.g., scope level #1, 2 or 3 (operation 2000). The arrangement and characteristics of the exemplary scope levels are provided and derived from the reference architecture 21 and the knowledge and experience of the software engineers and architects when referring to the reference architecture 21. Similarly, each of the decision instances 301 is ordered in accordance with a design model element 201 to which each of the decisions instances 301 pertains, as expressed by the scope attribute (operation 3000).

Here, it is noted that, while the classification, categorization and ordering of the decision instances 301 has been described as occurring in the sequence provided above, other sequences are possible. For example, another embodiment of the invention, the decision instances 301 could be categorized by scope and ordered by respective design model elements of the decision instances 301 before the classification by the respective phase attributes of the decision instances 301 takes place.

With reference now to the flow diagram of FIG. 4 (in which the exemplary numbers of phases, scope attributes and model elements shown in FIG. 3 are left out for purposes of clarity), it is noted that operations 1000, 2000 and 3000 are illustrated as being represented by arrows 1, 2 and 3, respectively.

That is, from the initial decision model 300, which is, in an exemplary embodiment of the invention, generated by the smart importer 50 and which includes the set of decision instances 301, which are each represented by individual illustrated blocks, arrow #1 indicates that a phase of each of the decision instances 301 is respectively classified as being a solution outline decision, one of two (2) macro design decisions or one of seven (7) micro design decisions. Again, it is understood that the classification discussed here is only exemplary and that other classification systems and methods are possible.

In similar fashion, arrow #2 indicates that the classified decision instances 301 are respectively categorized by scope attributes thereof. Here, the "solution outline" decision instance 301 and one of the "macro design" decision instances 301 are categorized as being within a particular "project" scope, the other "macro design" decision instance 301 and one of the "micro design" decision instances 301 are categorized as being within a particular "process" scope and the remaining "micro design" decision instances 301 are categorized as being within a particular "services" scope. Once again, it is understood that the categorizations discussed here is only exemplary and that other categorization systems and methods are possible (e.g., project to presentation layer to business logic layer to persistence layer to components).

Finally, arrow #3 indicates that the classified and categorized decision instances 301 are respectively ordered by design model elements 201. Here, sets of decision instances 301 relating to similar exemplary design model elements 201 are ordered into three (3) columns 502, 503 and 504.

Still referring to FIG. 4, it is noted that arrow #4 indicates the progression from results of operations 1000-3000 to those of operation 4000. In operation 4000, an actual or a virtual graph 500 is generated by the to-do list manager 60 to reflect information generated in operations 1000-3000. Directed links 501 are then created between graphed blocks representing dependent software design decision instances 301. Here, the dependencies are derived from the reference architecture 21. That is, a directed link 501 is created between blocks representing decision instances 301 where the reference architecture 21 suggests a linkage between the corresponding decision instances 301. In an embodiment of the invention, the linkage may be expressed as an arrow originating from a parent decision instance 301, which points toward a child decision instance 301.

Thus, it may be seen that the graph 500 represents the decision model 300 generated by the smart importer 50 as having been organized by the to-do list manager 60 into structured nodes of decision instances 301. That is, the graph 500 illustrates, for example, blocks 505 (including nodes C-D), 506 (including nodes E-F) and 507 (including nodes G-H). Each node represents a concrete "to-do" item. A block represents all decision instances to be made for a certain design model element after the decision model has been structured according to operations 1000, 2000, 3000, and 4000.

In accordance with embodiments of the invention, representations of decision instances 301 may be removed from or otherwise modified within the graph 500. The decisions instances in the blocks of nodes 506 and 507 can be removed if during the making of decision B it becomes clear that only the depending decision instances 301 represented by the blocks of node 505 are required, for instance because the chosen alternative forces the decision instances in the blocks of nodes 506 and 507 to no longer be applicable. Furthermore, nodes and blocks representing new decision instances 301 can be added during a real-time update of the graph 500.

In accordance with further embodiments of the invention, the to-do list manager 60 may comprise a constraint checker and propagator (CCP) 61 that allows the to-do list manager 60 to perform consistency checks. Here, from a given point in the decision model 300 represented by the graph 500, the CCP 61 analyzes the illustrated dependencies and, if the CCP 61 discovers an inconsistency, the CCP 61 produces an error message with a recommended action (i.e., to modify a decision instance 301).

With reference now to FIG. 5, it is noted that, in operation 5000, the to-do list manager 60 may additionally generate a to-do list interface 600 in which the classified, categorized and ordered decision instances 301 are displayed (see reference numeral 601) along with corresponding ones of the directed links (see reference numeral 602) and additional navigation information (see reference numeral 603). Here, the to-do list interface 600 displays the to-do list 501 as an expandable/collapsible, tree-structured table.

In accordance with further embodiments of the invention, the to-do list interface 600 may provide filtering criteria. In an example, such criteria may include a request for a display of only those decision instances 301 relevant for a specific role. Moreover, each displayed software design decision instance 301 may comprise a link (see e.g., reference numeral 601) to accessible decision making support information.

In accordance with still other embodiments of the invention, the to-do list interface 600 may comprise a community interface. Here, statistics may be calculated and displayed in charts showing how often and why certain alternatives were chosen. In this manner, decision patterns can be identified and learned from or improved upon.

In according with additional embodiments of the invention, it is understood that the smart importer 50 and/or the to-do list manager 60 may each be embodied as computer readable media having executable instructions stored therein that execute the methods discussed above.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A method of organizing received decision instances based on reference architecture, comprising:
  determining by a computing system a respective particular project phase attribute for each of the decision instances;
  classifying by a computing system the decision instances in accordance with each of the respective particular project phase attributes thereof;
  determining by a computing system a respective scope attribute for each of the decision instances in each set of decision instances classified in accordance with each of the respective particular project phase attributes;
  categorizing by a computing system the decision instances in accordance with each of the respective scope attributes thereof;
  for all decision instances with the same categorization and with the same classification, ordering, by the computing system, the corresponding decision instances by model elements to which each applicable decision instance refers;
  modeling, by the computing system, directed links between apparently dependent decision instances, whose apparent dependencies are derived from the reference architecture;
  analyzing, by the computing system, the dependent decision instances to confirm that the decision instances satisfy the apparent dependencies represented by the directed links and producing an error message if a result of the analysis is negative; and
  generating, by the computing system, a real-time updateable or modifiable to-do list as a graphical user interface in which the classified, categorized and ordered decision instances are displayed and represented along with corresponding directed links.

2. The method according to claim 1, wherein each representation of each of the decision instances comprises a link to accessible decision making support information.

3. The method according to claim 1, wherein the analyzing and the producing of the error message is accomplished by a constraint checker and propagator (CCP).

4. The method according to claim 1, wherein the generating of the to-do list interface comprises allowing for the representations to be filtered, modified, removed and/or interacted with in real-time, and wherein data provided by the interface is mined and subsequently analyzed.

5. A method of organizing received decision instances based on reference architecture, comprising:
 determining, by a computing system, a first attribute for each decision instance;
 classifying, by the computing system, the decision instances in accordance with the first attributes;
 determining, by the computing system, a second attribute for each decision instance in each set of decision instances classified in accordance with the first attributes;
 categorizing, by the computing system, the decision instance in accordance with the second attributes;
 for all decision instances with the same categorization and with the same classification, ordering, by the computing system, the decision instances by model elements;
 modeling, by the computing system, directed links between apparently dependent decision instances, whose apparent dependencies are derived from the reference architecture; and
 generating, by the computing system, an updateable or modifiable graphical user interface in which the classified, categorized and ordered decision instances are displayed along with the modeled directed links.

* * * * *